US012791159B2

(12) United States Patent
Ahn

(10) Patent No.: US 12,791,159 B2

(45) Date of Patent: Nov. 10, 2026

(54) MODULE LAMP, VEHICLE INCLUDING THE SAME, AND MODULE LAMP CONTROL DEVICE

(71) Applicants: HYUNDAI MOTOR COMPANY, Seoul (KR); KIA CORPORATION, Seoul (KR)

(72) Inventor: Byoung Suk Ahn, Hwaseong-si (KR)

(73) Assignees: HYUNDAI MOTO COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 19/188,708

(22) Filed: Apr. 24, 2025

(65) Prior Publication Data

US 2026/0146724 A1 May 28, 2026

(30) Foreign Application Priority Data

Nov. 22, 2024 (KR) ........................ 10-2024-0168306

(51) Int. Cl.
*F21S 41/657* (2018.01)
*F21S 2/00* (2016.01)

(52) U.S. Cl.
CPC ............. *F21S 41/657* (2018.01); *F21S 2/005* (2013.01)

(58) Field of Classification Search
CPC .... B60Q 1/0023; B60Q 1/076; B60Q 1/0483; B60Q 2400/50; F21S 41/657
See application file for complete search history.

(56) References Cited

U.S. PATENT DOCUMENTS 7,618,174 B2 * 11/2009 Yasuda ................ F21S 41/675 362/531
12,024,087 B2 * 7/2024 Mouri .................... B60Q 1/547

FOREIGN PATENT DOCUMENTS

CN 104890564 A * 9/2015 ........... B60Q 1/0023

OTHER PUBLICATIONS

Innovation Q+ NPL Search (Year: 2026).*

* cited by examiner

*Primary Examiner* — Anabel Ton
(74) *Attorney, Agent, or Firm* — MCDONNELL BOEHNEN HULBERT & BERGHOFF LLP

(57) ABSTRACT

A module lamp includes a lamp device and an aiming device rotating the lamp device, based on an aiming center, to adjust aiming. The aiming center is provided outside the aiming device. The lamp device includes a light emitting portion configured to generate light, and a body supporting the light emitting portion.

18 Claims, 9 Drawing Sheets

MODULE LAMP, VEHICLE INCLUDING THE SAME, AND MODULE LAMP CONTROL DEVICE

CROSS REFERENCE TO RELATED APPLICATIONS

This application claims benefit of priority to Korean Patent Application No. 10-2024-0168306 filed on Nov. 22, 2024 in the Korean Intellectual Property Office, the disclosure of which is incorporated herein by reference in its entirety.

BACKGROUND

1 Field

The present disclosure relates to a module lamp, a vehicle including the same, and a module lamp control device.

2 Description of Related Art

Welcome lighting and farewell lighting of a vehicle are lighting systems providing a visual greeting or farewell to the user whenever the user uses the vehicle.

Welcome lighting is mainly automatically operated when the user with a smart key approaches the vehicle, and headlights, side mirrors, door handles, interior lights, etc. may be turned on.

Through welcome lighting, the user may easily identify the location of the vehicle and safely and comfortably approach the vehicle even in a dark environment.

In addition, farewell lighting is operated when the user exits the vehicle and turns off the engine or moves away by a certain distance, thereby providing lighting that illuminates the surroundings to help the user to safely check the surroundings and get out.

Farewell lighting may provide a field of vision for the driver and passengers to check the surroundings and start walking by maintaining the headlights, side mirrors, and door handle lights in an on state for a certain period of time.

However, if there is an obstacle in a place in which the welcome lighting and farewell lighting are projected, a light pattern to be implemented may overlap the obstacle, causing a projected image to be distorted.

In particular, in a parking environment, etc., the projected image of the welcome lighting and farewell lighting may be distorted by surrounding vehicles due to a distance between vehicles.

SUMMARY

An aspect of the present disclosure is to provide a module lamp capable of adjusting aiming according to the presence or absence of an obstacle in front of a vehicle, a vehicle including the same, and a module lamp control device.

The purpose of the present disclosure is not limited to the purpose mentioned above, and other purposes not mentioned may be clearly understood by those skilled in the art to which the present disclosure pertains from the description below.

According to an aspect of the present disclosure, a module lamp includes: a lamp device; and an aiming device rotating the lamp device, based on an aiming center, to adjust aiming, wherein the aiming center is provided outside the aiming device.

The lamp device may include a first light emitting portion generating light, and a body supporting the light emitting portion.

The aiming center may be provided outside the body.

The aiming center may be provided in a lower portion of the light emitting portion.

The aiming device may include a bracket portion, a first link portion and a second link portion respectively having one side supported by the bracket portion and the other side coupled to the lamp device, the first link portion and the second link portion being connected by a connecting link, and a driving portion connected to one of the first link portion and the second link portion and generating driving force.

The first link portion may include a first shaft rotated by the driving portion, a first link having one side connected to the first shaft and the other side connected to the lamp device, and a first eccentric portion connected to the other side of the first link in a position spaced apart from a rotational center of the first shaft by a first eccentric radius and rotating together with the first shaft.

The second link portion may include a second shaft rotated by driving force transmitted through the connecting link, a second link having one side connected to the second shaft and the other side connected to the lamp device, and a second eccentric portion connected to the other side of the second link in a position spaced apart from a rotational center of the second shaft by a second eccentric radius and rotating together with the second shaft.

The module lamp may further include a guide portion provided in the bracket portion, and a sliding portion making a translational motion along the guide portion, wherein the second link portion and the lamp device are connected by the sliding portion.

The lamp device may further include a first light emitting portion connected to the first link portion and the second link portion to adjust aiming, and a second light emitting portion fixed to the bracket portion, wherein aiming of the first light emitting portion is adjusted independently of the second light emitting portion.

According to another aspect of the present disclosure, a module lamp control device for controlling one of the module lamps described above includes a sensor unit detecting an obstacle and a state of a vehicle, and a controller controlling the module lamp depending on whether an obstacle is detected.

When an obstacle is detected, the controller may lower the aiming of the module lamp.

When no obstacle is detected, the controller may raise the aiming of the module lamp.

The controller may control the module lamp to project a first image or a second image based on vehicle information detected by the sensor unit.

When the sensor unit detects that a vehicle lock is unlocked, the controller may control the module lamp to project the first image.

When the sensor unit detects that a vehicle engine is turned off, the controller may control the module lamp to project the second image.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figure 1:
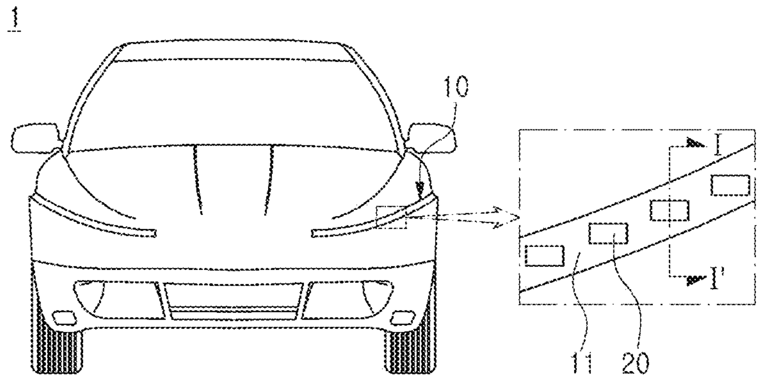
FIG. 1 is a diagram illustrating a headlamp of a vehicle.

While the present disclosure may be modified in various ways and take on various alternative forms, specific embodiments thereof are shown in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terms used herein to describe embodiments of the present disclosure is not intended to limit the scope of the present disclosure. The articles "a," and "an" are singular in that they have a single referent, however the use of the singular form in the present document should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Hereinafter, exemplary embodiments of the present disclosure will be described with reference to the accompanying drawings.

Figure 2:
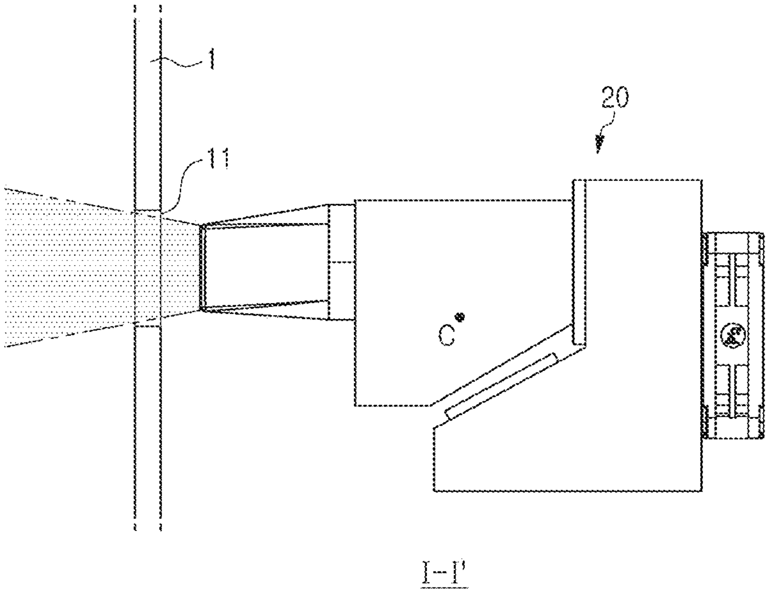
FIGS. 2 and 3 are diagrams illustrating a usage state of a module lamp in which an aiming center is provided in a body.
Figure 3:
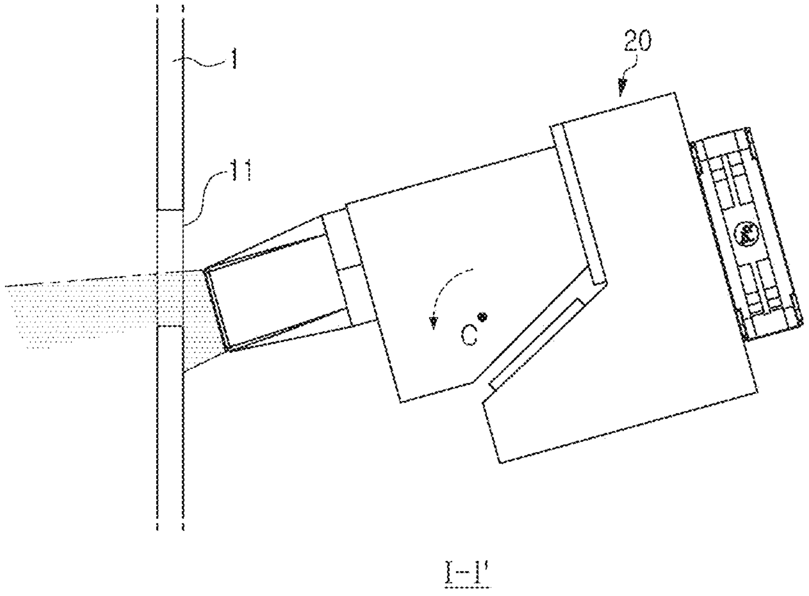

FIG. 1 is a diagram illustrating a headlamp 10 of a vehicle 1 as an example, and FIGS. 2 and 3 are diagrams illustrating a usage state of a module lamp 20 in which an aiming center C is provided in a body 120.

Recently, the headlamp 10 has been given new functions, such as providing a specific image visible to a user when the user gets into the vehicle or turns off the engine, or projecting a QR code using a module lamp, beyond the safety or information transmission functions, such as illuminating a dark place or guiding a driving direction.

Meanwhile, in a case in which there is an obstacle in an area in which the headlamp 10 is projected, an image to be projected using the lamp may overlap the obstacle, causing the image to be distorted.

In general, when projecting an image or pattern on the ground using the headlamp 10, the image or pattern may be displayed at a distance of about 8 meters or more from the vehicle 1.

Meanwhile, welcome lighting and farewell lighting technologies that project an image or pattern when entering or leaving a vehicle may be commonly implemented in parking lots.

However, considering the parking lot specifications and parking methods, in order to prevent the projected image or pattern from being distorted by parked vehicles, it is desirable to display the image or pattern on the ground at a distance of about 6 meters or less from the vehicle.

Here, assuming that a ride height of the headlamp 10 is 0.6 meters, in order to adjust the image or pattern projected by the module lamp 20 from 10 meters to 6 meters, the aiming of the module lamp 20 may have to be lowered by about 9 degrees.

Referring to FIGS. 2 and 3, when there is an obstacle in front of the vehicle 1, the aiming of the module lamp 20 may be adjusted downward to prevent distortion of the projected image due to the obstacle, so that the position of the projected image may be arranged close to the vehicle 1.

However, referring to FIG. 3, if an aiming axis of the module lamp 20 is located inside the module lamp 20, the projected light may escape from a light transmission portion 11 (e.g., external lens, etc.) allowing a portion of the projected light to pass therethrough to the outside of the vehicle 1.

That is, if an aiming center C of the module lamp 20 is located inside the module lamp 20, a portion of the projected light may interfere with the vehicle 1 and not be projected externally and the image or pattern exposed to the user may be distorted or damaged.

According to an embodiment of the present disclosure, in module lamp 20, while the aiming is adjusted so that the position of the image or pattern projected on the ground may be adjusted depending on the presence or absence of an obstacle, the image projected due to the aiming may not interfere with the vehicle 1.

Figure 4:
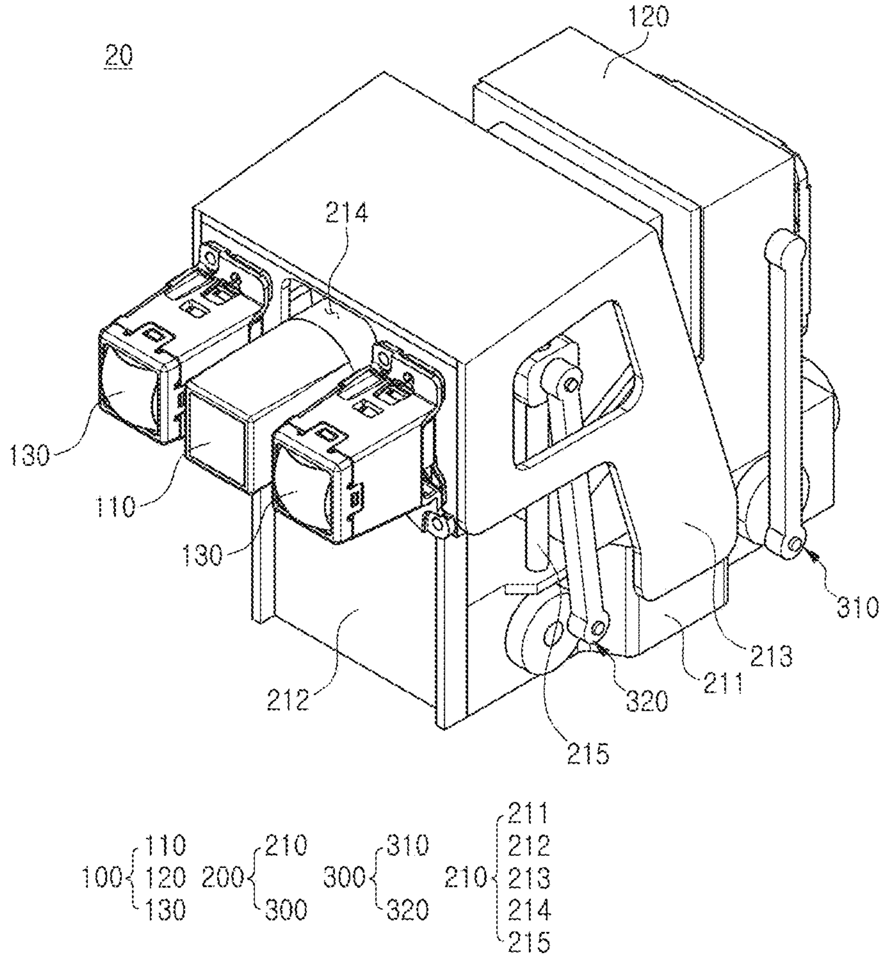
FIG. 4 is a perspective view of a module lamp according to an embodiment of the present disclosure.
Figure 5:
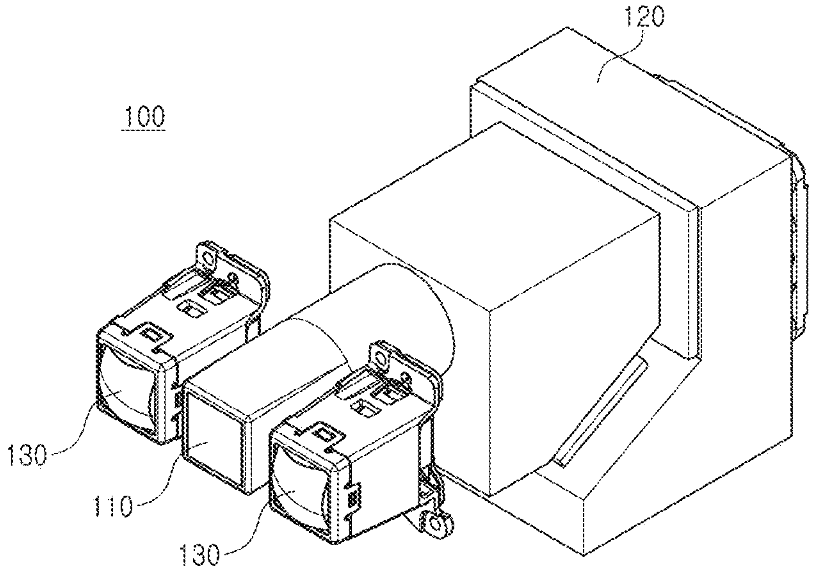
FIG. 5 is a perspective view of a lamp device according to an embodiment of the present disclosure.
Figure 6:
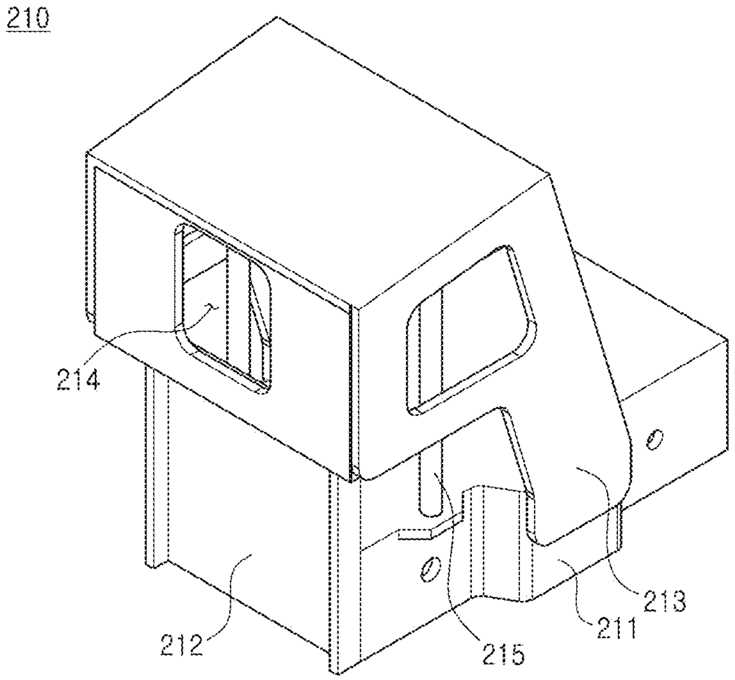
FIG. 6 is a perspective view of a bracket portion of an aiming device according to an embodiment of the present disclosure.
Figure 7:
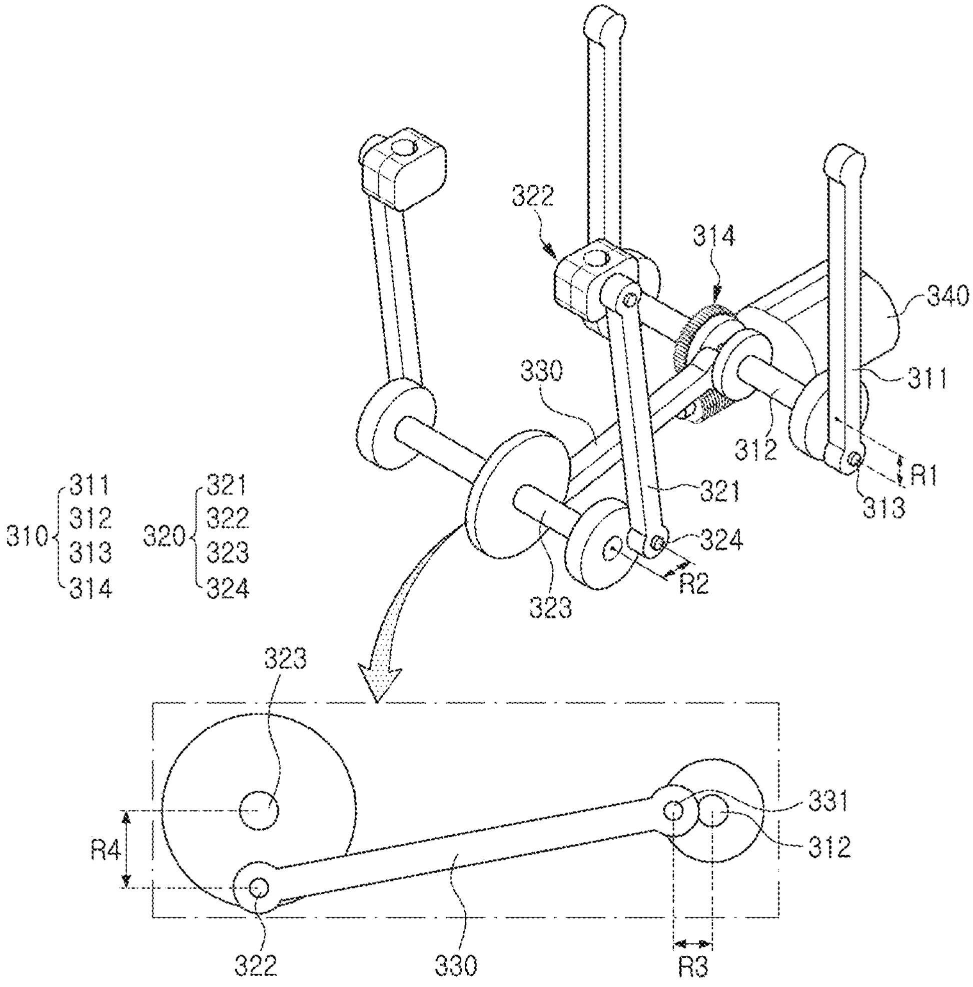
FIG. 7 is a perspective view of an aiming adjustment unit of an aiming device according to an embodiment of the present disclosure.

FIG. 4 is a perspective view of the module lamp 20 according to an embodiment of the present disclosure, FIG. 5 is a perspective view of a lamp device 100 according to an embodiment of the present disclosure, FIG. 6 is a perspective view of a bracket portion 210 of an aiming device 200 according to an embodiment of the present disclosure, and FIG. 7 is a perspective view of an aiming adjustment unit 300 of the aiming device 200 according to an embodiment of the present disclosure.

Referring to FIG. 4, the module lamp 20 according to an embodiment of the present disclosure may include the lamp device 100 generating light and projecting an image or pattern externally and the aiming device 200 adjusting the aiming of the lamp device 100.

Referring to FIG. 5, the lamp device 100 according to an embodiment of the present disclosure may include a first light emitting portion 110 generating light and projecting an image or pattern externally and a body 120 supporting the first light emitting portion 110.

In some embodiments, the first light emitting portion 110 may have high resolution.

The first light emitting portion 110 may project an image or pattern on a wall or ground in front of the vehicle 1 to display information to the user or to enhance aesthetics.

The lamp device 100 according to an embodiment of the present disclosure may further include a second light transmission portion 11 generating light.

Here, the first light emitting portion 110 may be configured to project an image or pattern on a wall or ground in front, and the aiming projected by the aiming device 200 may be adjusted.

Meanwhile, the second light transmission portion 11 may be fixed at a preset angle, such as a high beam, a low beam, or daytime running light, so that the aiming may not be adjusted.

Referring to FIGS. 6 and 7, the aiming device 200 according to an embodiment of the present disclosure may include an aiming adjustment unit 300 adjusting the aiming of the lamp device 100 and a bracket portion 210 supporting the aiming adjustment unit 300.

Referring to FIG. 6, the bracket portion 210 may include a first bracket 211 provided at the bottom of the lamp device 100, a second bracket 212 supported by the first bracket 211 and provided at the front of the lamp device 100, and a third bracket 213 supported by the first bracket 211 and the second bracket 212 and provided to surround the upper and both sides of the lamp device 100.

A guide portion 215 may have one end supported by the first bracket 211 and extend vertically between the lamp device 100 and the third bracket 213.

In addition, the other end of the guide portion 215 may be supported by the third bracket 213 to be provided more robustly.

The second bracket 212 may include a hole 214 through which the lamp device 100 may pass, and the body 120 of the lamp device 100 may be provided in a space surrounded by the first bracket 211 to the third bracket 213, and the first light emitting portion 110 may be provided outside the space surrounded by the first bracket 211 to the third bracket 213 by passing through the second bracket 212.

Referring back to FIG. 4, second light emitting portions 130 may be provided on both sides of the first light emitting portion 110 provided by passing through the hole 214 of the second bracket 212 and may be supported by the second bracket 212.

Through this, the first light emitting portion 110 and the second light emitting portion 130 may not interfere with each other in the upper and lower aiming adjustment of the first light emitting portion 110.

Referring to FIG. 7, the aiming adjustment unit 300 according to an embodiment of the present disclosure may include a first link portion 310, a second link portion 320, a connecting link 330, and a driving portion 340.

The first link portion 310 may include a first link 311, a first shaft 312, a first eccentric portion 313, and a gear portion 314.

The first shaft 312 may be supported at both ends by the first bracket 211 and may rotate by driving force transmitted from the driving portion 340.

More specifically, the first shaft 312 may be connected to the driving portion 340 through the gear portion 314.

For example, the driving portion 340 may be an electric motor generating driving force upon receiving electricity, and the driving force may be a force generated by a rotational motion generated by the motor.

The motor of the driving portion 340 may include a shaft, and the end of the shaft may be provided with a worm gear, the gear portion 314 of the first shaft 312 may be fixed to the first shaft 312 and may transmit driving force transmitted from the worm gear to the first shaft 312 so as to rotate together with the first shaft 312.

One side of the first link 311 may be coupled to the first shaft 312 through an eccentric portion, and the other side thereof may be coupled to the body 120.

The first eccentric portion 313 may be provided to deviate from a rotational axis of the first shaft 312 by a first eccentric radius R1.

Here, the first eccentric portion 313 may be a pin provided at a point deviating from the rotational axis in a plate structure fixed to and rotating on the first shaft 312, and one side of the first link 311 may be inserted into and fixed to the first eccentric portion 313.

Since the first link 311 is coupled to the first shaft 312 through the first eccentric portion 313, when the first shaft 312 rotates, the height of one side of the first link 311 may change, and accordingly, the height of the body 120 coupled to the other side of the first link 311 may also change.

The second link portion 320 may include a second link 321, a second shaft 323, a second eccentric portion 324, and a sliding portion 322.

The second shaft 323 may have both ends supported by the first bracket 211 and spaced apart from the first shaft 312. The second shaft 323 may be connected to the first shaft 312 through the connecting link 330 to be described below and may rotate by driving force transmitted through the connecting link 330.

One side of the second link 321 may be connected to the second shaft 323 through the second eccentric portion 324, and the other side thereof may be connected to the body 120.

Here, a coupling portion of the second link 321 and the body 120 may be provided between a coupling portion of the first link 311 and the body 120 and the first light emitting portion 110.

The second eccentric portion 324 may be provided to deviate from the rotational axis of the second shaft 323 by a second eccentric radius R2.

Here, the second eccentric portion 324 may be a pin provided at a point deviating from the rotational axis in the plate structure fixed to and rotating on the second shaft 323, and one side of the second link 321 may be inserted into and fixed to the second eccentric portion 324.

When the second link 321 is coupled to the second shaft 323 through the second eccentric portion 324 so the second shaft 323 rotates, the height of one side of the second link 321 may change, and accordingly, the height of the body 120 coupled to the other side of the second link 321 may also change.

Referring to FIG. 7 along with FIGS. 4 and 6, the other end of the second link 321 and a portion of the body 120 may be coupled through the sliding portion 322.

The sliding portion 322 may have a hollow shape, and a guide portion 215 may be inserted into the hollow. That is, the sliding portion 322 may perform a translational movement up and down along the guide portion 215.

Therefore, the other end of the second link 321 coupled to the sliding portion 322 and the body 120 may be constrained to the guide portion 215 and may only move up and down.

Therefore, since the second link 321 coupled to the body 120 only performs a vertical movement according to the guide portion 215, the movement of the first link 311 coupled to the body 120 may also have regularity.

The connecting link 330 may connect the first link portion 310 and the second link portion 320 and may transmit driving force transmitted to the first link 311 to the second link portion 320.

More specifically, one side of the connecting link 330 may be connected to the first link 311 through a third eccentric portion 331, and the other side thereof may be coupled to the second shaft 323 through a fourth eccentric portion 332.

Here, the third eccentric portion 331 may be provided to deviate from the rotational axis of the first shaft 312 by a third eccentric radius R3, and the fourth eccentric portion 332 may be provided to deviate from the rotational axis of the second shaft 323 by a fourth eccentric radius R4.

The third eccentric portion 331 may be a pin provided at a point deviating from the rotational axis in the plate structure fixed to and rotating on the first shaft 312, and one side of the connecting link 330 may be inserted into and fixed to the third eccentric portion 331.

The fourth eccentric portion 332 may be a pin provided at a point away from the rotational axis in the plate structure fixed to the second shaft 323 and rotating, and one side of the connecting link 330 may be inserted into and fixed to the fourth eccentric portion 332.

Through the first eccentric radius R1 and the second eccentric radius R2, the size of a vertical movement distance of the body 120 by the first link 311 or the second link 321 may be adjusted.

Through the third eccentric radius R3 and the fourth eccentric radius R4, the movement distance or relative movement of the second link 321 corresponding to the movement of the first link 311 may be adjusted.

The user may adjust a change in aiming according to operation of the driving portion 340 by adjusting the first eccentric radius R1 to the fourth eccentric radius R4.

Figure 8:
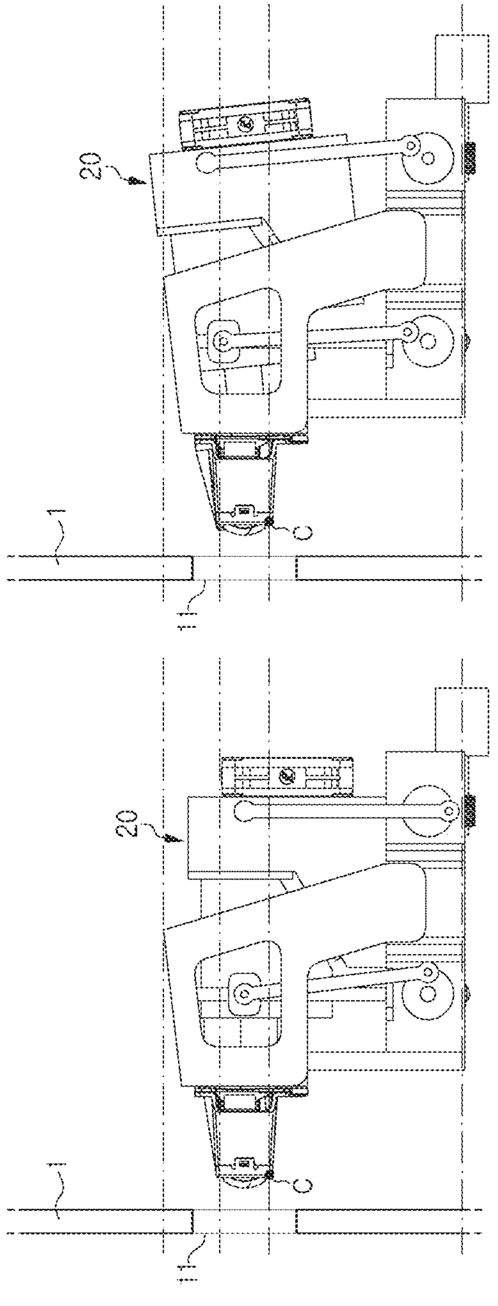
FIG. 8 is a diagram illustrating a usage state of a module lamp according to an embodiment of the present disclosure.

FIG. 8 is a diagram illustrating a usage stage of the module lamp 20 according to an embodiment of the present disclosure.

Referring to FIG. 8, the left drawing may be a first aiming state, and the right drawing may be a second aiming state.

Here, the first aiming may be aiming in a normal state, and the second aiming may be aiming in a state in which the aiming of the lamp device 100 is adjusted downward by the aiming device 200.

When the vehicle 1 is driving or there is no obstacle in front of the vehicle 1, the vehicle 1 may maintain the module lamp 20 in the first aiming state.

Meanwhile, when there is an obstacle in front of the vehicle 1, the vehicle 1 may adjust the module lamp 20 downward to adjust it to the second aiming state.

The aiming center C serving as a reference for the rotation of the module lamp 20 may be provided outside the aiming device 200.

More specifically, the aiming center C may be provided on the outside of the body 120.

In addition, the aiming center C may be provided on the outside, at the bottom, of the first light emitting portion.

Referring to FIG. 8 along with FIGS. 2 and 3, since the aiming center C is provided to be located at the lower end of the light emitting portion, even if the aiming of the lamp device 100 is adjusted downward, the entire projected image may be projected by passing through the light transmission portion 11.

That is, even if the module lamp 20 according to an embodiment of the present disclosure is aimed downward, the projected image or pattern may not be damaged or distorted by being blocked by the vehicle 1.

Figure 9:
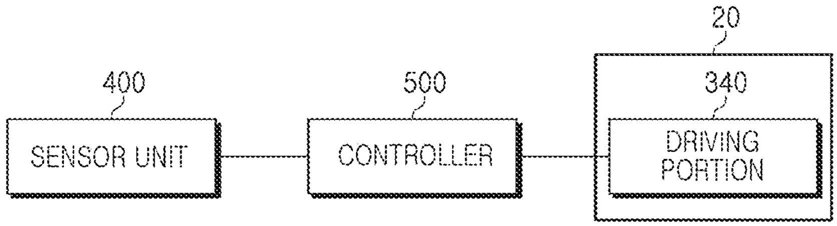
FIG. 9 is a block diagram of a module lamp control device according to an embodiment of the present disclosure.

FIG. 9 is a block diagram of a module lamp control device according to an embodiment of the present disclosure.

The module lamp control device according to an embodiment of the present disclosure may include a module lamp 20, a sensor unit 400, and a controller 500.

The module lamp 20 of the module lamp control device according to an embodiment of the present disclosure may utilize the module lamp 20 illustrated in FIGS. 4 to 8.

Referring to FIG. 9, the module lamp control device according to an embodiment of the present disclosure is described with reference to FIGS. 4 to 8, and any redundant description will be omitted hereinafter.

The sensor unit 400 may detect the state of the vehicle 1 and whether there is an obstacle in front.

More specifically, the sensor unit 400 may detect whether the vehicle 1 is unlocked and whether the engine of the vehicle 1 is turned off.

In addition, the sensor unit 400 may detect whether there is an obstacle in front of the vehicle 1.

The sensor unit 400 may be one of a radar, a light detection and ranging (LIDAR), a camera, an ultrasonic sensor, and an infrared sensor. However, without being limited thereto, and various sensors capable of detecting objects in front may be applied to the sensor unit 400.

The controller 500 may adjust the aiming of the module lamp 20 based on the status information of the vehicle 1 received from a receiver and the information on the presence or absence of an obstacle.

For example, when the sensor unit 400 detects that there is no obstacle in front, the controller 500 may maintain the lamp device 100 of the module lamp 20 in the first aiming state and project an image or pattern.

In addition, when the sensor unit 400 detects that there is an obstacle in front, the controller 500 may adjust the lamp device 100 of the module lamp 20 to a second state and project an image or pattern.

Here, the first aiming may be aiming in a normal state, and the second aiming may be aiming in a state in which the aiming of the lamp device 100 is adjusted downward by the aiming device 200.

The controller 500 may be implemented through a non-volatile memory (not shown) configured to store data regarding an algorithm configured to control operation of various components of the vehicle 1 or software instructions for reproducing the algorithm and a processor (not shown) configured to perform the operation described below using the data stored in the memory.

Here, the memory and the processor may be implemented as separate chips. Alternatively, the memory and the processor may be implemented as a single chip integrated with each other. The processor may take the form of one or more processors.

The components of the module lamp control device according to an embodiment of the present disclosure may be connected by wire or wirelessly to exchange information. For example, data may be sent and received using communication units, such as Ethernet, media oriented systems transport (MOST), Flexray, controller area network (CAN), local interconnect network (LIN), Internet, LTE, 5G, Wi-Fi, Bluetooth®, near-field communication (NFC), Zigbee®, and radio frequency (RF).

Figure 10:
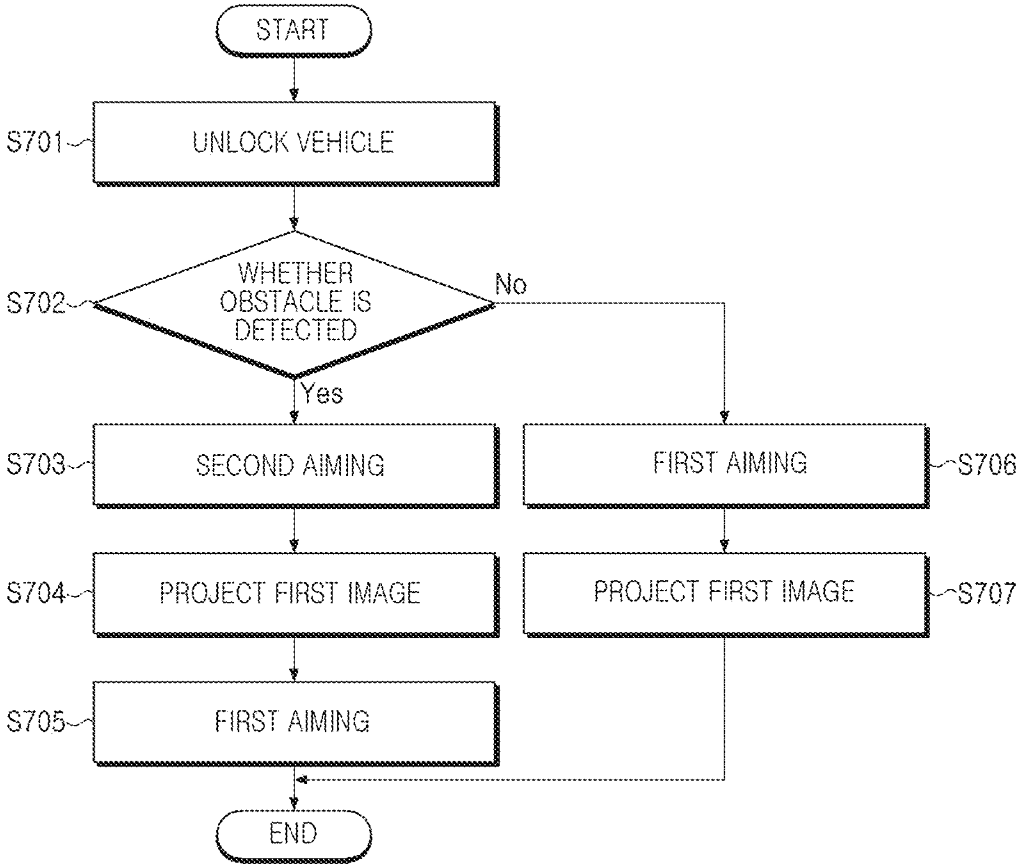
FIG. 10 is a flowchart for controlling a module lamp according to an embodiment of the present disclosure.
Figure 11:
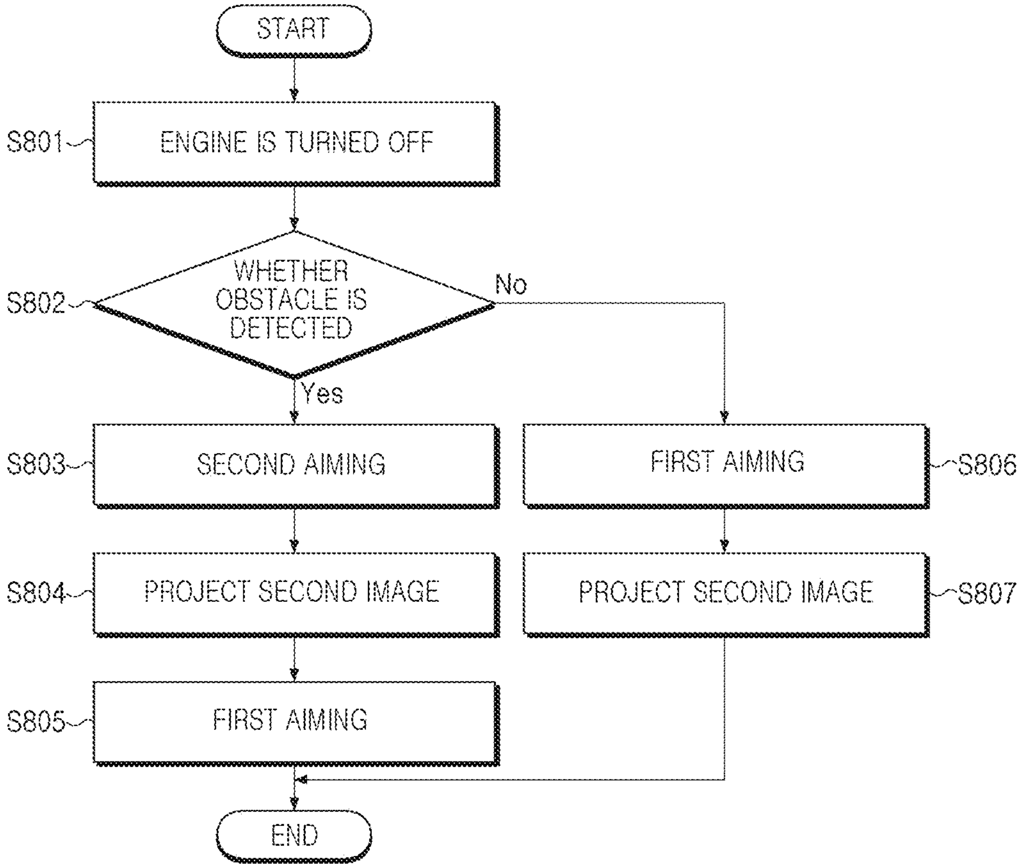
FIG. 11 is a flowchart for controlling a module lamp according to an embodiment of the present disclosure.

FIG. 10 is a flowchart for controlling the module lamp 20 according to an embodiment of the present disclosure, and FIG. 11 is a flowchart for controlling the module lamp 20 according to an embodiment of the present disclosure.

FIG. 10 may be a flowchart for controlling the module lamp 20 in the case of implementing welcome lighting, and FIG. 11 may be a flowchart for controlling the module lamp 20 in the case of implementing farewell lighting.

In addition, a first image may be an image or pattern projected during welcome lighting, and a second image may be an image or pattern projected during farewell lighting. The first image and the second image may be variously set by the user, and the first image and the second image may be the same.

Referring to FIG. 10, the sensor unit 400 may detect whether the vehicle 1 is unlocked (S701).

For example, when the user unlocks the smart key at a distance from the vehicle 1, the sensor unit 400 may detect whether the vehicle 1 is unlocked by detecting a signal of the smart key. Alternatively, the sensor unit 400 may directly detect whether the door lock of the vehicle 1 is unlocked, and detect whether the vehicle 1 is unlocked (S701).

When the vehicle 1 is detected to be unlocked, the sensor unit 400 may detect whether there is an obstacle in front of the vehicle 1 (S702).

If an obstacle is detected in front of the vehicle 1, the controller 500 may switch the module lamp 20 to the second aiming state (S703).

The controller 500 may project the first image using the module lamp 20 in the second aiming state so that the first image may be displayed close to the vehicle 1 (S704).

That is, the controller 500 may adjust the aiming of the module lamp 20 downward to minimize distortion of the projected image or pattern due to interference from an obstacle in front of the vehicle 1.

The controller 500 may return the module lamp 20 that has been switched to the second aiming state back to the first aiming state (S705).

For example, when the sensor unit 400 detects that the vehicle 1 is driving, the controller 500 may return the module lamp 20 to the first aiming state.

Alternatively, the controller 500 may project the first image for a preset period of time. When the set time has elapsed and the module lamp 20 no longer projects the first image, the controller 500 may return the module lamp 20 to the first aiming state.

Meanwhile, when the sensor unit 400 detects that there is no obstacle in front, the controller 500 may not adjust the aiming of the module lamp 20 (S706).

That is, the controller 500 may directly project the first image using the module lamp 20 in the first aiming state (S707).

Referring to FIG. 11, the sensor unit 400 may detect whether the engine of the vehicle 1 is turned off (S801).

The sensor unit 400 may directly detect whether the engine of the vehicle 1 is turned off or may be connected to a central controller (not shown) of the vehicle 1 to receive information on whether the engine of the vehicle 1 is turned off.

When the engine of the vehicle 1 is turned off, the sensor unit 400 may detect whether there is an obstacle in front of the vehicle 1 (S802).

When an obstacle is detected in front of the vehicle 1, the controller 500 may switch the module lamp 20 to the second aiming state (S803).

The controller 500 may project the second image using the module lamp 20 in the second aiming state so that the second image may be displayed close to the vehicle 1 (S804).

That is, the controller 500 may adjust the aiming of the module lamp 20 downward to minimize the distortion of the projected image or pattern due to interference caused by an obstacle in front of the vehicle 1.

The controller 500 may return the module lamp 20 that has been switched to the second aiming state to the first aiming state (S805).

For example, the controller 500 may project the second image for a preset period of time. If the preset time has elapsed and the module lamp 20 no longer projects the second image, the controller 500 may return the module lamp 20 to the first aiming state.

Meanwhile, when the sensor unit 400 detects that there is no obstacle in front, the controller 500 may not adjust the aiming of the module lamp 20 (S806).

That is, the controller 500 may directly project the first image using the module lamp 20 in the first aiming state (S807).

The module lamp control device according to an embodiment of the present disclosure may project the first image or the second image according to the state of the vehicle 1 and expose the same to the user, thereby enhancing the aesthetic sense of the user.

In addition, the module lamp control device according to an embodiment of the present disclosure may minimize distortion or damage of the image projected by the obstacle by changing the aiming according to the presence or absence of an obstacle in front.

The module lamp, the vehicle including the same, and the module lamp control device according to an embodiment of the present disclosure may adjust the aiming according to the presence or absence of an obstacle in front of the vehicle.

In particular, the module lamp, the vehicle including the same, and the module lamp control device according to an embodiment of the present disclosure may prevent the projected light from interfering with the vehicle by adjusting the aiming, thereby preventing damage to the projected image.

The effects of the present disclosure are not limited to those described above, and other effects not mentioned will be clearly recognized by those skilled in the art from the description below.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or may be publicly known and available to those who are skilled in the field of computer software.

Examples of the computer readable medium may include a hardware device, such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module in order to perform the embodiments of the present disclosure, and vice versa.

While example embodiments have been shown and described above, it will be apparent to those skilled in the art that modifications and variations could be made without departing from the scope of the present disclosure as defined by the appended claims.

The invention claimed is:

1. A module lamp comprising:

a lamp device; and an aiming device configured to rotate the lamp device, based on an aiming center, to adjust aiming of the lamp device;

wherein the aiming center is positioned outside the aiming device; and wherein the aiming device includes:

a bracket portion;

a first link portion having a first side supported by the bracket portion and a second side coupled to the lamp device;

a second link portion having a first side supported by the bracket portion and a second side coupled to the lamp device;

a connecting link connecting the first link portion and the second link portion; and a driving portion connected to one of the first link portion and the second link portion, and configured to generate driving force.

2. The module lamp of claim 1, wherein the lamp device includes:

a light emitting portion configured to generate light; and a body supporting the light emitting portion.

3. The module lamp of claim 2, wherein the aiming center is positioned outside of the body.

4. The module lamp of claim 2, wherein the aiming center is positioned in a lower portion of the light emitting portion.

5. The module lamp of claim 1, wherein the first link portion includes:

a first shaft configured to be rotated by the driving portion;

a first link having a first side connected to the first shaft, and a second side connected to the lamp device; and a first eccentric portion connected to the second side of the first link spaced apart from a rotational center of the first shaft by a first eccentric radius, and configured to rotate together with the first shaft.

6. The module lamp of claim 1, wherein the second link portion includes:

a second shaft configured to be rotated by driving force transmitted through the connecting link;

a second link having a first side connected to the second shaft and a second side connected to the lamp device; and a second eccentric portion connected to the second side of the second link spaced apart from a rotational center of the second shaft by a second eccentric radius, and configured to rotate together with the second shaft.

7. The module lamp of claim 6, further comprising:

a guide portion positioned in the bracket portion; and a sliding portion configured to move translationally along the guide portion;

wherein the second link portion and the lamp device are connected by the sliding portion.

8. The module lamp of claim 1, wherein the lamp device further includes:

a first light emitting portion connected to the first link portion and the second link portion, and configured to adjust aiming; and a second light emitting portion fixed to the bracket portion;

wherein aiming of the first light emitting portion is adjusted independently of the second light emitting portion.

9. The module lamp of claim 8, wherein the second light emitting portion comprises two second light emitting portions positioned on opposite sides of the first light emitting portion.

10. The module lamp of claim 1, wherein the bracket portion comprises:

a first bracket positioned at a bottom of the lamp device;

a second bracket supported by the first bracket and positioned at a front of the lamp device; and a third bracket supported by the first bracket and the second bracket, and surrounding the lamp device.

11. The module lamp of claim 10, further comprising a guide portion positioned in the bracket portion, wherein the guide portion has one end supported by the first bracket, and the guide portion extends vertically between the lamp device and the third bracket.

12. The module lamp of claim 11, wherein the second bracket includes a hole through which the lamp device passes, and the body of the lamp device is positioned in a space surrounded by the first bracket to the third bracket.

13. A vehicle comprising the module lamp of claim 1.

14. A module lamp control device configured to control a module lamp, the module lamp comprising:

a lamp device; and an aiming device configured to rotate the lamp device, based on an aiming center, to adjust aiming of the lamp device;

wherein the aiming center is positioned outside the aiming device; and wherein the module lamp control device further comprises:

a sensor unit configured to detect an obstacle and a state of a vehicle; and a controller configured to control the module lamp based on whether an obstacle is detected, wherein, when an obstacle is detected, the controller is configured to lower the aiming of the module lamp.

15. The module lamp control device of claim 14, wherein, when no obstacle is detected, the controller is configured to raise the aiming of the module lamp.

16. The module lamp control device of claim 14, wherein the controller is configured to control the module lamp to project a first image or a second image based on vehicle information detected by the sensor unit.

17. The module lamp control device of claim 16, wherein, when the sensor unit detects that a vehicle lock is unlocked, the controller is configured to control the module lamp to project the first image.

18. The module lamp control device of claim 16, wherein, when the sensor unit detects that a vehicle engine is turned off, the controller is configured to control the module lamp to project the second image.

* * * * *